(12) United States Patent
Jeong et al.

(10) Patent No.: US 6,777,476 B2
(45) Date of Patent: Aug. 17, 2004

(54) POLYPROPYLENE RESIN COMPOSITION

(75) Inventors: Kieyoun Jeong, Kyungki-Do (KR); Seung-Wook Lee, Daejeon-Si (KR); Seung-Wook Hwang, Daejeon-Si (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 10/331,245

(22) Filed: Dec. 30, 2002

(65) Prior Publication Data

US 2003/0170477 A1 Sep. 11, 2003

(30) Foreign Application Priority Data

Mar. 9, 2002 (KR) .................................. 10-2002-0012667

(51) Int. Cl.$^7$ .................................................. C08K 3/00
(52) U.S. Cl. ........................ 524/424; 524/425; 524/426; 524/427; 524/562; 524/570; 524/847; 524/445; 524/451; 524/495; 524/496; 524/491; 524/477; 524/490; 525/191; 525/216; 525/232; 525/240; 525/241

(58) Field of Search .................................. 524/502, 570, 524/847, 445, 451, 495, 496, 491, 477, 490, 424, 425, 426, 427; 525/191, 216, 232, 240, 241

(56) References Cited

U.S. PATENT DOCUMENTS 6,498,213 B2 * 12/2002 Jeong et al. ................. 525/191

* cited by examiner

*Primary Examiner*—William Cheung
(74) *Attorney, Agent, or Firm*—Morgan Lewis & Bockius LLP

(57) ABSTRACT

A polypropylene resin composition for automobile interior materials, more particularly to a polypropylene resin composition including a crystalline polypropylene and rubber mixture wherein inorganic filler, atactic polypropylene and process oil are added to offer good flexibility, heat-resistance, cold-resistance, extrusion coating property and calender processing property and to remove offensive odor, which is specially useful for back coat of automobile mats.

16 Claims, No Drawings

POLYPROPYLENE RESIN COMPOSITION

FIELD OF THE INVENTION

The present invention relates to a polypropylene resin composition for automobile interior materials, and more particularly, to a polypropylene resin composition comprising crystalline polypropylene, rubber, inorganic filler, atactic polypropylene, and process oil, wherein the composition has good flexibility, heat-resistance, cold-resistance, extrusion coating property and calender processing property as well as no offensive odor. The present invention also relates to a mat made thereof, particularly an automobile mats wherein the polypropylene resin composition forms the back coating material.

BACKGROUND OF THE INVENTION

At present, polyvinyl chloride (PVC) compositions are widely used as automobile interior materials—including surface materials such as an instrument panel, a door trim and a sun visor and automobile interior mat back coat—because it has a wide mechanical property range and can be processed in various forms at a reasonable cost. However, PVC-based formulations require addition of large amount of plasticizer, which in the confines of an automobile give off offensive odor, and also requires a heat stabilizer, which presents environmental concerns relating to heavy metals contained in the heat stabilizer.

Generally, the automobile interior automobile mat consists of three layers. In prior art mats the top layer is mostly made of the nylon fiber; the intermediate layer comprises polyethylene terephthalate and polyvinyl acetate copolymer; and the bottom layer, that is the back coat, is made of aforementioned polyvinyl chloride or styrene-butadiene-styrene (SBS) copolymer. This three-layered mat is formed by extrusion or calendering molding and then cut by the press and tailored to generate a finished product.

The odor of a mat can substantially detract from the quality and ambiance of automobiles. Polyvinyl chloride, commonly used for the bottom layer of the automobile mat, requires the flexibility of rubber to be used as the back coat. This flexibility is typically achieved by compounding the PVC with large quantities of plasticizers. However, an offensive odor caused by the plasticizer cannot be avoided because the plasticizers are odiferous and a large amount of plasticizer is used to obtain the flexibility.

Also, polyvinyl chloride has poor heat-resistance and cold-resistance when used in an automobile, for example as a floor mat. Automobiles experience extremes in heat in the summer and also can reach the coldest temperatures the automobile experienced during the winter, and the floor mat is stressed in both of these environments. Also, automobile mats are washed frequently. PVC-based automobile mats will be weakened and fail, i.e., crack or lose adhesion, in the cold of winter season or in the heat of tropical regions. Heat stabilizers can be used to improve its heat-resistance of the PVC composition, but these heat stabilizers contain a large amount of undesirable heavy metals. Therefore, polyvinyl chloride-based compositions are not environmentally friendly.

Also in the prior art a styrene-butadiene-styrene copolymer formulation has been used to form the back-coat of an automobile mat. Compared with polyvinyl chloride, styrene-butadiene-styrene copolymer has better flexibility, heat-resistance and cold-resistance. But, styrene-butadiene-styrene copolymer formulations also give out an offensive odor and less than ideal moldability.

Another alternative material tried by industry is the use of olefinic thermoplastic. Although the olefinic thermoplastic resins have good injection, extrusion and blow moldability, a large amount of rubber must be admixed with the olefinic thermoplastic resins to obtain the flexibility required for the back coat of automobile mats. The use of a large amount of rubber causes the viscosity problems during extrusion coating and calendering molding, and also gives negative effect on the heat-resistance of the finished product. Also, the use of a large amount of expensive rubber increases the production cost.

Polypropylene is an inexpensive polyolefin. However, polypropylene does not readily make a composition with the required hardness. A polypropylene-based composition having a rubber to polypropylene ratio of 90 wt %:10 wt % does not exhibit the required low hardness level. And, the high rubber content as mentioned above causes cohesion to the roll during extrusion coating and reduces heat-resistance. Although inorganic fillers can be used to address the moldability and heat-resistance problems, these increase the hardness of the blend so that the flexibility required for the back coat cannot be obtained. Additionally, the composition with the required rubber is not economical compared with polyvinyl chloride-based compositions.

As used herein, the term "automobile" is meant to encompass motorized vehicles, including for example trucks, buses, and the like. As used herein, the term "mat" is meant to encompass a material placed on or over a floor. As used herein, the term "back coat" means a layer, which may or may not be continuous, below the top of a mat.

The units for composition and properties are as is usually known in the art, unless otherwise defined here. As used herein, polymeric compositions are characterized by the parts by weight of reactants that are put into the polymeric composition, wherein the number of parts is typically around 100, and is usually 100. Therefore, the term "parts" is generally synonymous with the term "percent by weight". It is recognized that one or more of the ingredients may lose its identity or may be lost during the processing and/or during subsequent aging of the polymeric product, for example by partially reacting with other components or by losing semivolatile materials. The properties of the composition are generally measured on the composition after mixing and curing.

SUMMARY OF THE INVENTION

As mentioned above, there has been a long-standing recognized need in the industry for the development of materials for automobile interiors, especially with respect to this invention for a material useful for automobile mat back coats. It is desirable to have the back coat of automobile mats made of a material that:

1) has a low hardness as to offer the flexibility to the back coat, for example less than 50A (Shore A hardness), preferably less than 40A, for example between about 30A and 40A, to offer good adhesion to the floor and to prevent deformation;

2) has good extrusion coating and calendering properties, known collectively herein as moldability;

3) has good heat-resistance and good low-temperature impact resistance over the temperature range which may be experienced by a significant number of automobiles;

4) has low emissions of volatile and semivolatile compounds, especially odiferous compounds, as compared to prior art alternative materials; and 5) that is cost effective with the materials in the prior art alternatives.

It is advantageous that the rubber content of the material be lower than about 70 wt %, preferably lower than about 50%, for example between about 35% and about 50%. It is advantageous that the hardness is lower than 50 A, preferably lower than 45A, more preferably lower than about 40A, for example between about 30A and about 40A. It is advantageous that the material have a good fogging value, that is, emits little material that forms a fog-like film on for example a glass.

Accordingly, one embodiment of the invention is a polypropylene composition, and an automobile mat comprising a layer thereof, the composition comprising atactic polypropylene, rubber, fillers, for example one or more inorganic fillers, and process oil. This composition has the mentioned properties required for automobile mat back coats and can be processed by various molding methods.

Accordingly another embodiment of the invention is a resin composition, and an automobile mat comprising a layer thereof, said resin composition comprising: crystalline polypropylene in an amount sufficient to obtain enhanced moldability; atactic polypropylene in an amount sufficient to reduce hardness and provide low-temperature impact resistance; process oil in an amount sufficient to provide enhanced processability; and one or more fillers in an amount sufficient to provide the required adequate heat resistance and moldability. This resin composition has the required hardness, good flexibility, heat-resistance, cold-resistance and moldability, and has no offensive odor.

Another embodiment of the invention is a resin composition, and an automobile mat back coat made with a layer thereof, said resin composition comprising: crystalline polypropylene, a crystalline propylene-based copolymer, or both; atactic polypropylene, an atactic propylene-based copolymer, or both; process oil in an amount sufficient to provide enhanced processability, and one or more fillers. This embodiment may optionally include one or more rubbers as described herein.

Another embodiment of the invention is a resin composition, and an automobile mat back coat made with a layer thereof, said resin composition comprising: crystalline polypropylene; atactic polypropylene; rubber; process oil; and fillers. These resin compositions have the required hardness, good flexibility, heat-resistance, cold-resistance and moldability, and has no offensive odor.

The invention also includes the method of making a mat which includes providing as a material for the back coat a composition of the present invention, and a mat comprising a composition of the present invention.

DETAILED DESCRIPTION OF THE INVENTION

The present invention relates to a polypropylene resin composition, and to an automobile mat having in at least a part thereof the polypropylene resin composition, which in a first embodiment comprises:

(A) Between about 1 to about 30% by weight, preferably more than 10% by weight, for example between about 15 and about 25% by weight, of atactic polypropylene comprising propylene monopolymer and/or copolymer, i.e., a bipolymer of propylene and 1–20% by weight of $C_{2-10}$ α-olefin, wherein the atactic polypropylene has a Pentad isotactic index lower than about 30;

(B) Between about 10 to about 20% by weight, for example between about 10 and about 15% by weight, of crystalline polypropylene comprising propylene monopolymer and/or copolymer of propylene and 1–25% by weight of at least one $C_{2-10}$ α-olefin, i.e., a crystalline bipolymer of propylene and between 3 and 10 mole percent ethylene, wherein the crystalline polypropylene has a melt index of about 0.5 to about 10 g/10 min at 230° C. and a weight average molecular weight greater than 150,000 g/mol;

(C) Between about 30 to about 70% by weight, preferably between about 30 and about 60% by weight, for example between about 35 and about 45% by weight, of ethylene-α-olefin copolymer rubber, for example a bipolymer of ethylene and 25–60% by weight of $C_{3-10}$ α-olefin, wherein the ethylene-α-olefin copolymer rubber has a Mooney viscosity of between about 20 and about 90 (ML1+4, 100° C.);

(D) Between about 1 to about 30% by weight, for example greater than about 10%, i.e., between about 20 and about 25% by weight, of process oil, selected from paraffinic oil, aromatic oil, naphthenic oil, or mixtures thereof, and advantageously having a kinematic viscosity of 10–80 cSt (40° C.), for example having a kinematic viscosity of between about 50–200 centistokes, i.e., a paraffinic processing oil with a viscosity of about 150 centiStokes at 40° C.; and (E) Between about 1 to about 20% by weight, for example above about 3% by weight, i.e., between about 5 and about 20%, preferably between about 5 and about 10%, of a filler, for example an inorganic filler, preferably but not limited to an inorganic filler selected from talc, calcium carbonate, calcium sulfate, magnesium oxide, calcium stearate, mica, silica, calcium silicate, clay, carbon black, or mixtures thereof, and beneficially of a particle size below about 20 μm.

Advantageously, in one subset of the above embodiments, the amount of (A) atactic polypropylene and (C) ethylene-α-olefin copolymer rubber together is between about 50% and about 70%, for example between about 55% and about 60%. Advantageously, in some embodiments the amount of (A) atactic polypropylene is at least one third of the amount of (C) ethylene-α-olefin copolymer rubber.

In one embodiment, each of the above-listed embodiments, and an automobile mat back coat made with a layer thereof, consists essentially of the above-listed components in the above-mentioned amounts. In another embodiment, any of the above-listed embodiments can optionally further comprise (F) a small amount, for example less than about 3% by weight, of additives which may include pigments, processing aids, anti-static additives, anti-stick additives, stabilizers, compatibilizers, antioxidants, UV stabilizers, fungicides, bacteriocides and the like such as those which generally are used in polymeric compositions.

In a less preferred embodiment, the above-listed compositions can further comprise: (G) between about 0.1 to about 30% by weight, for example between about 1 and about 15%, of a semicrystalline polypropylene, wherein the semicrystalline polypropylene comprises a semicrystalline propylene homopolymer and/or a semicrystalline copolymer of propylene and at least one $C_{2-10}$ α-olefin.

In an alternate embodiment, the present invention relates to a soft polypropylene resin composition, and an automobile mat back coat made with a layer thereof, which comprises; atactic polypropylene, rubber, fillers, for example one or more inorganic fillers, and process oil.

In another embodiment of the present invention, the automobile mat of the present invention includes 1–30 parts by weight of atactic polypropylene comprising propylene monopolymer or bipolymer of propylene and 1–20 wt % of $C_{2-10}$ α-olefin; (B) 10–20 parts by weight of crystalline polypropylene comprising propylene monopolymer or bipolymer of propylene and 1–25 wt % of $C_{2-10}$ α-olefin; (C) 30–70 parts by weight of ethylene-α-olefin copolymer rubber comprising bipolymer of ethylene and 25–60 wt % of $C_{2-10}$ α-olefin; (D) 1–30 parts by wt of process oil, having 10–800 cSt (40° C.) of kinematic viscosity, selected from paraffinic oil, aromatic oil and naphthenic oil; and (E) 1–20 parts by wt of an inorganic filler selected from talc, calcium carbonate, calcium sulfate, magnesium oxide, calcium stearate, mica, silica, calcium silicate, clay and carbon black.

In one embodiment, each of the above-listed embodiments, and an automobile mat back coat made with a layer thereof, consists essentially of the above-listed components in the above-mentioned amounts. In another embodiment, any of the above-listed embodiments can optionally further comprise a small amount, for example less than about 3 parts or percent by weight, of additives which may include pigments, processing aids, anti-static additives, anti-stick additives, stabilizers, compatibilizers, antioxidants, UV stabilizers, fungicides, bacteriocides and the like such as those which generally are used in polymeric compositions.

In another embodiment, any of the above embodiments, and an automobile mat back coat made with a layer thereof, can optionally further comprise ceramic, polymeric, glass, and/or carbon fibers. Generally such fibers are not considered to be part of the resin composition.

Hereunder is given a more specific description of each constituent.

(A) Atactic Polypropylene:

Atactic polypropylene with lower crystallinity than the conventional polypropylene is used to enhance impact resistance and moldability and reduce hardness of the resin compositions of this invention. Atactic polypropylene replaces all or part of rubbers in the prior art formulations, and is a characteristic constituent of the present invention.

Atactic polypropylene is so called due to its crystal structure. Because it has much lower crystallinity than isotactic or crystalline polypropylene, it has low hardness and good flexibility, impact resistance and low contraction property. Also, it imparts the softness of rubbers, while having better heat-resistance than rubbers.

Atactic polypropylene is obtained as a byproduct in the process of manufacturing crystalline polypropylene, for example following the separation process of U.S. Pat. No. 4,256,874, or is alternatively produced by using a metallocene catalyst following the process of U.S. Pat. No. 5,723,546 under the brand REXFLEX™ available from Rexene Corporation of Dallas, Tex. Although the metallocene catalyst's product has good properties, it is not advantageous in terms of cost. As for the byproduct obtained in the manufacture process of crystalline polypropylene, lower molecular-weight atactic polypropylene is advantageously dissolved by aliphatic hydrocarbon solvents like heptane and centrifuged to increase crystallinity. The atactic polypropylene separated as slurry typically has 1,000–3,000 of number-average molecular weight and 100,000–200,000 of weight-average molecular weight.

While the conventional polypropylene has 90–100 of Rockwell hardness, the atactic polypropylene has about ¹/₁₀ of crystallinity and hardness which may be between about 65A and about 75A, for example about Shore 70A. Therefore, it is advantageous to incorporate atactic polypropylene into the low-hardness automobile mat back coats of the present invention. The low contraction, low hardness and impact resistance of atactic polypropylene were previously disclosed by the inventors (Korea Patent Nos. 286857 & 290079).

The atactic polypropylene comprises propylene monopolymer (homopolymer) and/or copolymer of propylene and up to 20%, for example 1–20 wt %, of $C_2$ or $C_{10}$ α-olefin (termed here a $C_{2-10}$ α-olefin). Preferably, the atactic polypropylene used herein comprises propylene monopolymer or propylene and between about 1–20 wt % of ethylene, or a mixture thereof, provided the atactic polypropylene mixture exhibits the required properties. Preferably, the atactic polypropylene used herein has a Pentad isotactic index lower than 30, for example between about 10 and about 20, i.e., about 14.

In one embodiment, the atactic polypropylene used herein has a weight-average molecular weight of between about 20,000–200,000 g/mol, for example about 40,000–140,000 g/mol, i.e., about 100,000 g/mol. For atactic polypropylene homopolymers, the weight average molecular weight is in one embodiment about 100,000 g/mol to about 200,000 g/mol. For atactic polypropylene homopolymers and/or copolymers, the weight average molecular weight is preferably about 20,000 g/mol to about 100,000 g/mol.

The number-average molecular weight of the atactic polypropylene in one embodiment is above about 1000. The number-average molecular weight of the atactic polypropylene may in another embodiment range from about 3000 to above 5000 of number-average molecular weight, i.e., about 5000 of number-average molecular weight.

In the atactic polypropylene copolymer, the amount of $C_{2-10}$ α-olefin is between up to about 20 weight percent, and is preferably between about 2% and about 10%. In one embodiment the atactic polypropylene copolymer has an ethylene content between 2–10 wt %. In a preferred atactic polypropylene bipolymer, the $C_{2-10}$ α-olefin is ethylene and the ethylene content is preferred to be 2–10 wt %.

In a preferred embodiment the weight-average molecular weight of atactic polypropylene is preferred to be 20,000–100,000 g/mol, the Pentad isotactic index to be 10–20.

The atactic polypropylene can be present in the resin composition in an amount between about 1 to about 30% by weight, preferably more than 10% by weight, for example between about 15 and about 25% by weight.

(B) Crystalline Polypropylene:

Crystalline polypropylene is added in an amount sufficient to impart adequate moldability to the material for back coats. The crystalline polypropylene may comprise crystalline propylene monopolymer, a crystalline copolymer of propylene and 1–25% by weight of at least one $C_{2-10}$ α-olefin, or mixture thereof. For example, a crystalline copolymer of propylene and 1–25% by weight of at least one $C_{2-10}$ α-olefin may be a crystalline bipolymer of propylene and and 1–25 wt % of a $C_{2-10}$ α-olefin. Or, several crystalline bipolymers of propylene and and 1–25 wt % of a $C_{2-10}$ α-olefin, and optionally crystalline polypropylene homopolymer, can be used, provided the crystalline polypropylene mixture exhibits the required crystalline properties. Suitable homopolymers of propylene include highly isotactic polypropylenes. The α-olefin content in the copolymer, which is in one embodiment a bipolymer, is preferred to be 2–15% by weight. The particular $C_{2-10}$ α-olefins polymerized with propylene are not limited, so long as the polypropylene has the required crystallinity. For example, ethylene, butene-1,4-methyl-pentene-1, hexene-1 and octene can be used. An acceptable copolymer of propylene is a crystalline ethylene-propylene copolymer having about 6 mole percent ethylene.

The crystalline polypropylene used herein advantageously has a melt index of 0.5-log/10 min (230° C.), for example between 0.5–5 g/10 min (230° C.). A preferred embodiment uses a crystalline ethylene-propylene copolymer with a melt index of about 3 g/10 min (230° C.) using the standard 2.16 Kgf force.

The weight-average molecular weight of said crystalline polypropylene (B) is greater than 150,000 g/mol.

The crystalline polypropylene used herein advantageously has more than 200,000 g/mol of weight-average molecular weight, for example about 280,000 g/mol of weight-average molecular weight. If the melt index falls outside said range and the weight-average molecular weight is lower than said range, good molding is difficult because the melt flows freely during extrusion molding. Also, in calendering molding, the melt tension is too low to offer stable molding.

In one embodiment the melt index is preferred to be 0.5–5 g/10 min (230° C.) and the weight-average molecular weight is preferred to be higher than 200,000 g/mol.

The crystalline polypropylene is incorporated into the resin composition in an amount of at least about 10 parts or percent by weight, preferably between about 10 and about 20 parts or percent by weight, for example between about 10 and about 15 parts or percent by weight. If the crystalline polypropylene content is lower than 10 parts or percent by weight, the moldability becomes poor. In contrast, if the crystalline polypropylene content exceeds 20 parts or percent by weight, the hardness of the product increases sharply, which requires increased amounts of rubber and/or process oil contents. This in turn results in the increase in fogging value and also to the increase in cost of unit production as well as process oil.

(C) Ethylene-α-olefin Copolymer Rubber:

Ethylene-α-olefin copolymer rubber is a copolymer of ethylene and $C_{2-10}$ α-olefin, added to enhance impact resistance and reduce hardness. Ethylene-α-olefin copolymer rubbers are known in the art. Examples of α-olefins particularly useful in the formation of ethylene copolymer rubber are propylene, butene, pentene, hexene, propene and octene. Exemplary ethylene copolymer rubbers having the required characteristics include ethylene-propylene rubber (EPR), ethylene-propylene-diene monomer (EPDM) rubber, and ethylene-octene copolymer rubber (EOR).

Among these, the ethylene-propylene copolymer rubber is particularly preferable in that it has irregular molecular structure, which offers low hardness. Also, it has no offensive odor and easily miscible with process oil. The ethylene-propylene copolymer rubber used herein advantageously contains 20 to about 60 weight percent, more preferably 25 to 35 weight percent, of propylene content. The ethylene-propylene copolymer rubber used herein advantageously has a Mooney viscosity of 20–90, more preferably 40–80 (ML1+4, 100° C.). In one embodiment the ethylene-propylene copolymer rubber has a Mooney viscosity of about 40 (ML1+4, 120° C.), and a propylene content of about 28% by weight.

In one embodiment, at least portion of the ethylene-α-olefin copolymer rubber can be a terpolymer rubber, that is, an ethylene-α-olefin-based terpolymer rubber, another synthetic rubber, natural rubber, or mixture thereof. A terpolymer rubber will typically include from about 30 to about 80 weight percent of ethylene; typically from about 20 to about 60 weight percent of a second alpha-olefin, i.e., propylene, and typically from about 0.5 to about 12 weight percent of a third alpha-olefin or a non-conjugated diene. When a terpolymer rubber is used, the amount of diene in the terpolymer is not critical. Suitable dienes include straight chain dienes such as 1,4-hexadiene; cyclic dienes such as cyclooctadiene or dicyclopentadiene; and bridged cyclic dienes such as ethylidene norbornene. Such a terpolymer rubber may have a Mooney Viscosity of between about 10 and about 120 (ML1+4, 100° C.).

The ethylene-α-olefin copolymer rubber in an alternate embodiment will typically include from about 30 to about 80 weight percent of ethylene and from about 20 to about 70 weight percent of a second alpha-olefin such as 1-hexene or 1-octene.

Mixtures of two or more ethylene-α-olefin copolymer rubbers can be used.

The ethylene-α-olefin copolymer rubber is present in the resin composition in an amount between about 30 and about 70 parts or percent by weight, preferably between about about 30 and about 60 parts or percent by weight, for example between about 35 and about 45 parts or percent by weight. If it is lower than 30 parts or percent by weight, the desired low hardness cannot be obtained. If it is higher than 70 parts or percent by weight, the back coat moldability becomes poor, and the production costs increase.

Advantageously, in one embodiment, the amount of (A) atactic polypropylene and (C) ethylene-α-olefin copolymer rubber together is between about 50% and about 70%, for example between about 55% and about 60%. Advantageously, in some embodiments the amount of (A) atactic polypropylene is at least one third of the amount of (C) ethylene-α-olefin copolymer rubber.

(D) Process Oil:

Process oil is added to obtain the desired hardness and moldability while keeping the rubber content low. Process oil is a kind of softener. The softener refers to combination oil used to enhance rubber flexibility and processing property and increase volume. It is classified as process oil and extender oil, but as used herein both of them are called the process oil for convenience. The main purposes of using process oil are increasing composition workability, processing property, and flexibility. In this regard, use of the process oil can offer solutions of moldability, low hardness and odor.

Process oils are classified as paraffinic, naphthenic and aromatic. Any of these, or a combination of two or more of these, can be used in the present invention.

Among these process oils, paraffinic oil is desirable in terms of odor. There are normal paraffin and iso-paraffin in paraffinic oils. Paraffinic oils are hardly discolored and also are most superior in terms of detectable odor. Paraffinic oils have low strength but provide a composition with good compressibility, low-temperature properties, and anti-pollution (i.e., low metals) property.

Naphthenic oil imparts intermediate properties between paraffinic and aromatic oils to the resin composition. While naphthenic oil has good anti-pollution property, low-temperature property, processing property, anti-aging property and cold-resistance, it has poor tensile strength and elasticity. Most of all, naphthenic oil is inferior to paraffinic oil in terms of odor.

Aromatic oil imparts good physical properties, like naphthenic oils, to the resin composition. But aromatic oil are most disadvantageous in terms of odor.

It is most advantageous to use paraffinic oil to remove offensive odor inside the automobile. Advantageously the process oil is paraffinic oil, or alternatively a mixture of primarily paraffinic oil with a lesser quantity of aromatic oil and/or naphthenic oil.

A variety of paraffinic oils are available according to the kinematic viscosity. Generally, a process oil with a kinematic viscosity of 10–800 cSt (40° C.), preferably 50–200 cSt, is desirable. One particularly useful embodiment uses a paraffinic processing oil with a viscosity of about 150 centiStokes.

The process oil is incorporated into the resin composition in an amount between about 1 and about 30 parts or percent by weight, for example between about 10 and about 25 parts or percent by weight. If the process oil content is below this range, it does not impart the desired properties to the resin composition, and if the process oil content is above this range, the fogging value tends to undesirably increase due to the surface transition of the process oil. A preferred formulation has process in an amount between about 20 and about 25 parts or percent by weight.

(E) Filler:

Both organic and inorganic fillers are contemplated to be within the scope of the present invention provided that they impart the desired properties, and do not interfere with the desired properties, of the polymeric resin. Exemplary fillers include calcium carbonate, calcium silicate, wollastonite, silica, glass, alumina, alumina trihydrate, barium sulfate, calcium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin and various other kinds of clay, mica, carbon such as carbon black, calcium oxide, magnesium oxide, aluminum hydroxide, polymer particles, chitin and/or chitin derivatives. The filler particles are in one embodiment preferably inorganic filler particles.

In one embodiment the filler particles may be partially or fully treated, for example coated with a fatty acid such as stearic acid and/or behenic acid, which may facilitate the free flow of the particles (in bulk) and their ease of dispersion into the polymer matrix.

The inorganic filler advantageously enhances the mat's adhesion to floor by improving heat resistance and increasing rigidity and weight. For inorganic fillers, one or more of talc, calcium carbonate, calcium sulfate, magnesium oxide, calcium stearate, mica, silica, calcium silicate, clay and carbon black can be used. Among these, calcium carbonate and talc are preferential.

The particle size of the fillers is recommended to be smaller than 20 $\mu$m, for example about 15 $\mu$m.

The inorganic filler is incorporated into the resin composition in an amount up to about 20 parts or percent by weight, for example between 1 and 20 parts or percent by weight. If the filler content falls outside this range, the hardness increases and the odor becomes offensive. In one preferred embodiment the filler is present in the composition in an amount between about 5 and about 10 parts or percent by weight.

(F) Optionally Additives

In another embodiment, any of the above-listed compositions can optionally further comprise a small amount, for example less than about 3 parts, of additives which may include pigments, processing aids, anti-static additives, anti-stick additives, stabilizers, compatibilizers, antioxidants, UV stabilizers, fungicides, bacteriocides and the like such as those which generally are used in polymeric compositions.

(G) Optionally Semicrystalline Polypropylene

In a less preferred embodiment, the above-listed compositions can further comprise: (G) between about 0.1 to about 30% by weight, for example between about 1 and about 15%, of a semicrystalline polypropylene, wherein the semicrystalline polypropylene comprises a semicrystalline propylene homopolymer and/or a semicrystalline copolymer of propylene and at least one $C_{2-10}$ $\alpha$-olefin.

The polypropylene resin composition described above has better physical properties, including flexibility, than the conventional resin compositions. Also, the offensive odor can be repressed effectively. Therefore, it is useful for automobile interior materials, especially for automobile mat back coats. The polypropylene resin composition according to this invention can also be useful in other parts of an automobile, for example to replace soft PVC sheets in automobile seat covers and head liners.

Hereunder is given a more detailed description of this invention using examples. The following examples are to be illustrative of this invention and should not be construed as limiting the scope of this invention.

EXAMPLES 1–8

The examples 1 to 8 were formulated with varying amounts, shown in Table 1, of:

(A) atactic polypropylene resin having 5,000 g/mol of number-average molecular weight, 100,000 g/mol of weight-average molecular weight and 14 of Pentad isotactic index;

(B) crystalline polypropylene having 3 g/10 min of melt index, 250,000 g/mol of weight-average molecular weight and 6 mol % of ethylene content;

(C) ethylene-propylene rubber having 40 of Mooney viscosity (ML1+4, 120° C.) and 28 wt % of propylene content;

(D) paraffinic process oil having 150 cSt (40° C.) of kinematic viscosity; and (E) talc having 15 μm average particle size.

These resin compositions were mixed as in Table 1. Each resin composition was mixed in a Banbury mixer at 160° C. for 5 min and extruded with a single extruder at 190–220° C. The product was cooled and solidified to obtain a pelletized composition. The obtained compositions were coated to a mat comprising polyethylene terephthalate and nylon fibers in a T-die extrusion coater, the extruder temperature being 170–190° C. and the cooling roll temperature, 50° C. The results of various tests performed on Examples 1–8 are shown in Table 1.

COMPARATIVE EXAMPLES 1–2

Table 1 also shows the composition and test results of prior art formulations. Polyvinyl chloride and styrene-butadiene-styrene copolymer formulations currently on the market, 1 and 2 in the comparative examples section of Table 1, were molded as in the Examples.

COMPARATIVE EXAMPLES 3–4

Only the (B) and (C) constituents, i.e., crystalline polypropylene and ethylene-propylene rubber, were mixed in amounts shown in Table 1 to obtain resin compositions. These compositions were mixed in Banbury mixer at 160° C. for 5 min and extruded with a single extruder at 190–220° C. The product was cooled and solidified to obtain a pelletized composition. The obtained compositions were coated to a mat comprising polyethylene terephthalate and nylon fibers in a T-die extrusion coater, the extruder temperature being 170–190° C. and the cooling roll temperature, 50° C. The results of testing are shown in the comparative examples section of Table 1. The hardness of these formulations exceeded the preferred range, and the heat resistance properties were unacceptable.

COMPARATIVE EXAMPLES 5–8

Compositions comprising at least three of the constituents (A)–(E), but not containing the compositions in the ranges and also not having all components (A)–(E) present, were prepared as in Examples 1–8. These compositions were coated to a mat comprising polyethylene terephthalate and nylon fibers in a T-die extrusion coater, the extruder temperature being 170–190° C. and the cooling roll temperature, 50° C. The compositions and the results of testing are shown in the comparative examples section of Table 1. It can be seen that Comparative Example 8 had reasonable results for all tests, despite not having filler. However, this comparative example had a large quantity of expensive rubber incorporated therein.

The testing results include physical properties shown in Table 1. Physical properties were determined by the following methods.

Shore A Hardness—Hardness is presented as Shore A hardness. The lower the value, the softer the product is. The back coat of an automobile mat sample (15 cm×15 cm×0.6 cm) was tested by Shore hardness meter of Zwick™ (Switzerland) according to JIS K 6301. The retention time was set at 10 s. The Shore hardness represents softness of the material.

Thermal Aging Property—The product is affected by the climate and environment of the place of use. The thermal aging becomes more significant in warm environment. Accordingly, the product with good heat-resistance aging property can be used for a long time in countries with warm weather. Thermal aging was emulated by subjecting the automobile mat to 70° C. in a convection oven for 300 hr. The sample's surface crack and deformation status was evaluated as good, moderate and poor where Good means no deformation; moderate means observable deformation; and poor means deformation and surface crack, as is shown in (Notes) of Table 1.

Heat-Resistance Cycle Property—The automobile mat was put in a temperature-controlled moisture-controlled bath. The temperature was then varied according to a predetermined cycle where one cycle was: 3 hr at 80° C., then 1 hr at room temperature, then 3 hr at −30° C., then 1 hr at room temperature, then 10 hr at 50° C. and 95% RH, then 1 hr at room temperature. After three cycles, surface crack and deformation status was evaluated as good, moderate and poor. The specific evaluation standard is shown in (Notes) of Table 1.

Adhesion to Floor—It was determined if the automobile mat adheres to the floor without gap. The adhesion property was evaluated as good (no gap), moderate (a little gap) and poor (the sample deforms and rolls up). The good adhesion property means that the product is superior in function and appearance.

Odor—The automobile mat sample (10 cm×10 cm×1.5 cm) was put in a sealed 4L container. The container was heated at 60±2 degrees for about 1 hr and 20 min. The sample was allowed to cool down for 20 min and its odor was tested thereafter. A total of five people performed the odor test, and the result was graded into five different levels accordingly. That is, each person judged whether the odor was offensive or not, and the test result is the number of people out of five who judged that the sample emits no offensive. The resulting number becomes the rating of the sample. Usually, the automakers consider the rating larger than 4 as good. The higher rating means less odor, which is meaningful in improving automobile interior environment.

Fogging value—A sample of an automobile mat was cut into a circle of 70 mm in diameter. It was put in a beaker and covered on top with a clean glass plate. The beaker was heated at 100° C. in a silicone oil bath for 4 hr. Semivolatiles may escape from the mat and be plated on the glass, as is known to occur in cars. The transparency of the glass plate was measured with a hazemeter.

Moldability—Moldability for T-die extrusion coating molding was determined qualitatively by those of ordinary skill in the art. Adhesion of nylon fiber to the extrusion roll, adhesion to fiber substrates and molding status of backing agent were determined and incorporated.

TABLE 1

| Constituents | | A | B | C | D | E | Hardness (Shore A) | Heat-Resistant Aging Property | Heat-Resistant Cycle Property | Fogging Value | Adhesion to Floor | Odor | Moldability |
|---|---|---|---|---|---|---|---|---|---|---|---|---|---|
| Examples | 1 | 10 | 15 | 60 | 10 | 5 | 45A | Good | Good | 5 | Moderate | 4 | Good |
| | 2 | 10 | 10 | 60 | 10 | 10 | 48A | Good | Good | 5 | Moderate | 4 | Good |
| | 3 | 15 | 10 | 50 | 15 | 10 | 40A | Good | Good | 7 | Moderate | 4 | Good |
| | 4 | 20 | 15 | 40 | 20 | 5 | 38A | Good | Good | 8 | Good | 4 | Good |
| | 5 | 25 | 15 | 35 | 20 | 5 | 37A | Good | Good | 8 | Good | 4 | Good |
| | 6 | 20 | 15 | 35 | 25 | 5 | 35A | Moderate | Good | 9 | Good | 4 | Good |
| | 7 | 20 | 10 | 35 | 25 | 10 | 38A | Good | Good | 9 | Good | 4 | Good |
| | 8 | 15 | 10 | 45 | 20 | 10 | 33A | Good | Good | 8 | Good | 4 | Good |
| Comparative Examples | 1 | Poly vinyl chloride | | | | | 70A | Poor | Poor | 25 | Poor | 2.5 | Good |
| | 2 | SBS copolymer | | | | | 55A | Good | Good | 3 | Good | 3 | Good |
| | 3 | | 10 | 90 | | | 67A | Moderate | Poor | 2 | Poor | 4 | Poor |
| | 4 | | 20 | 80 | | | 75A | Moderate | Poor | 2 | Poor | 4 | Poor |
| | 5 | 10 | 20 | 70 | | | 70A | Moderate | Moderate | 2 | Poor | 4 | Good |
| | 6 | | 20 | 70 | 10 | | 64A | Moderate | Moderate | 4 | Poor | 4 | Good |
| | 7 | | 20 | 70 | | 10 | 95A | Moderate | Poor | 1 | Poor | 4 | Good |
| | 8 | 10 | 20 | 60 | 10 | | 48A | Moderate | Moderate | 4 | Moderate | 4 | Good |

(Notes)
A Atactic polypropylene: Number-average molecular weight = 5,000 g/mol; weight-average molecular weight = 100,000 g/mol; Pentad II = 14
B Crystalline polypropylene: Melt index = 3 g/10 min (230□, 2.16 Kgf); weight-average molecular weight = 280,000 g/mol; ethylene content = 6 mol%
C Rubber: Ethylene-propylene rubber; Mooney viscosity = 40 (ML1 + 4, 120□); propylene content = 28 wt %
D Process oil: Paraffinic process oil; kinematic viscosity = 150 cSt
E Inorganic filler: Talc; particle size = 15 μm
* Heat-resistant aging property & High/low-temperature cycle property:
Good = no deformation; moderate = deformation;
poor = deformation + surface crack
* Moldability: Adhesion to roll, adhesion to fiber substrate and surface status of backing agent As can be confirmed in Table 1, the composition prepared by Examples of this invention shows the Shore A hardness lower than 50A, which offers flexibility required for back coats. Indeed, many of the formulations exhibited a hardness of less than 40A. It can be seen that increasing the amount of atactic polypropylene to above 15 parts per hundred in these examples gave hardness values below 40. A high amount of rubber, if combined with a lower amount of atactic polypropylene, such as in Examples 1 and 2, provided a product with a hardness between 45A and 50A. However, Examples 6 and 7, each with a combined amount of rubber and atactic polypropylene together as low as 55%, exhibited excellent hardness and physical properties.

Increasing the amount of processing oil gave good processability, but the fogging increased with increasing amounts of processing oil.

The "comparative example" compositions 1 and 2, with crystalline polypropylene and rubber, had unacceptable hardness despite having very high percentages of rubber, and had poor performance regarding moldability and poor performance with heat resistance. Adding 10 parts atactic polypropylene, or 10 parts processing oil, to the crystalline polypropylene and rubber formulation as in comparative examples 5 and 6 respectively, gave a formulation with unacceptable hardness despite having very high percentages of rubber, and had poor performance regarding moldability and poor performance with heat resistance. Adding 10% filler to the crystalline polypropylene and rubber formulation gave a very hard product.

However, a formulation comprising crystalline polypropylene, atactic polypropylene, rubber, and processing oil gave a product with acceptable properties.

The best performance, however, was provided by formulations containing crystalline polypropylene, atactic polypropylene, rubber, processing oil, and a filler. These Examples had good heat-resistant aging property, heat-cycle property and adhesion to floor. Also, it emits little offensive odor and offers good moldability.

As explained above, the polypropylene resin composition according to this invention, prepared from the conventional crystalline polypropylene, atactic polypropylene (soft polypropylene with the Pentad isotactic index lower than 30), process oil and inorganic filler, has flexibility required for automobile mat back coat and good heat-resistance, cold-resistance and adhesion to floor, despite the small rubber content. Also, because most of the resin composition constituents are olefinic, the offensive odor is reduced. And because the plasticizer is not used in large amount, the problems related with heavy metals can be prevented.

Accordingly, the polypropylene resin composition prepared by this invention can solve the problems of offensive odor and heavy metals. Also, decrease in use of expensive rubber can offer economical advantages.

What is claimed is:

1. A polypropylene resin composition that contains:

(A) 1–30 parts by wt of atactic polypropylene comprising propylene monopolymer or bipolymer of propylene and 1–20 wt % of $C_{2-10}$ α-olefin and having a Pentad isotactic index lower than about 30 and a weight-average molecular weight of between about 20,000 to about 200,000 g/mol;

(B) 10–20 parts by wt of crystalline polypropylene comprising propylene monopolymer or bipolymer of propylene and 1–25 wt % of $C_{2-10}$ α-olefin and having a melt index of from about 0.5 to about 10 g/10 min at 230C and a weight-average molecular weight greater than 150,000 g/mol;

(C) 30–70 parts by wt of ethylene-α-olefin copolymer rubber comprising a bipolymer of ethylene and 25–60 wt % of $C_{2-10}$ α-olefin;

(D) 1–30 parts by wt of process oil, having 10–800 cSt (40C) of kinematic viscosity, wherein said process oil is selected from a group consisting of paraffinic oil, aromatic oil and naphthenic oil; and (E) 1–20 parts by wt of inorganic filler, wherein said inorganic filler is selected from a group consisting of talc, calcium carbonate, calcium sulfate, magnesium oxide, calcium stearate, mica, silica, calcium silicate, clay and carbon black.

2. A car mat comprising a back coat containing the polypropylene resin composition of claim 1.

3. A polypropylene resin composition comprising:

(A) between about 10 and about 30% by weight of atactic polypropylene having a Pentad isotactic index lower than about 30 and a weight-average molecular weight of between about 20,000 to about 200,000 g/mol;

(B) between about 10 to about 20% by weight of crystalline polypropylene having a melt index of from about 0.5 to about 10 g/10 min at 230C and a weight-average molecular weight greater than 150,000 g/mol;

(C) between about 30 to about 60% by weight of ethylene-α-olefin copolymer rubber, wherein the amount of (A) atactic polypropylene and (C) ethylene-α-olefin copolymer rubber together is between about 50% and about 70%;

(D) between about 10 to about 30% by weight of process oil comprising paraffinic processing oil and having a kinematic viscosity of 10–800 cSt at 40C;

(E) between about 5 to about 20% by weight of a filler with a particle size below about 20 μm, wherein the hardness of the cured polypropylene resin composition is less than 50 Shore A.

4. The polypropylene resin composition of claim 3 wherein:

the amount of (A) atactic polypropylene is between about 15 and about 25% by weight, wherein the atactic polypropylene comprises propylene monopolymer, a propylene copolymer having 1–20% by weight of $C_{2-10}$ α-olefin, or mixture thereof, and the atactic polypropylene has a hardness less than about Shore 75A; and the amount of ethylene-α-olefin copolymer rubber is between about 35 and about 45% by weight and comprises ethylene-propylene copolymer rubber having a Mooney viscosity of between about 20 to about 90 (ML1+4, 100C).

5. The polypropylene resin composition of claim 3 wherein:

the melt index of the crystalline polypropylene is between about 0.5 to about 5 g/10 min at 230C and the weight-average molecular weight is greater than 200,000 g/mol; and the atactic polypropylene Pentad isotactic is between about 10 and about 20.

6. The polypropylene resin composition of claim 3 wherein:

the filler comprises talc, calcium carbonate, calcium sulfate, magnesium oxide, calcium stearate, mica, silica, calcium silicate, clay, carbon black, or mixtures thereof.

7. The polypropylene resin composition of claim 4 wherein:

the atactic polypropylene weight average molecular weight is about 20,000 g/mol to about 100,000 g/mol, the number-average molecular weight of the atactic polypropylene is above about 1000, and the Pentad isotactic index between about 1 and about 20.

8. The polypropylene resin composition of claim 3 wherein:

the crystalline polypropylene is present in an amount between about 10 and about 15% by weight, wherein the melt index of the crystalline polypropylene is between about 0.5 to about 5 g/10 min at 230C and the weight-average molecular weight is greater than 200,000 g/mol;

the atactic polypropylene is present in an amount between about 15 and about 30% by weight and comprises propylene homopolymer, a propylene copolymer of propylene and up to 20% of a $C_{2-10}$ α-olefin the ethylene-α-olefin copolymer rubber is present in an amount between about 35 and about 45% by weight and comprises ethylene-propylene copolymer rubber having a Mooney viscosity of between about 20 to about 90 (ML1+4, 100C); and wherein the hardness of the cured polypropylene resin composition is less than 40 Shore A.

9. The polypropylene resin composition of claim 8 wherein:

the filler is selected from talc and calcium carbonate;

the processing oil has a kinematic viscosity of about 50–200 at 40C; and the ethylene-propylene copolymer rubber has a Mooney viscosity of between about 40 to about 80 (ML1+4, 100C).

10. The polypropylene resin composition of claim 3 wherein the composition consists essentially of atactic polypropylene, crystalline polypropylene, ethylene-α-olefin copolymer rubber, process oil, and a filler, wherein the hardness of the cured polypropylene resin composition is less than 40 Shore A.

11. A car mat comprising a layer of the polypropylene resin of claim 3.

12. A car mat comprising a layer of the polypropylene resin of claim 4.

13. A car mat comprising a layer of the polypropylene resin of claim 5.

14. A car mat comprising a layer of the polypropylene resin of claim 2.

15. A polypropylene resin composition comprising:

1–30 parts by wt of atactic polypropylene comprising propylene monopolymer or bipolymer of polypropylene and 1–20 wt % of $C_{2-10}$ α-olefin and having a Pentad isotactic index lower than about 30 and a weight-average molecular weight of between about 20,000 to about 200,000 g/mol;

30–70 parts by wt of ethylene-α-olefin copolymer rubber comprising a bipolymer of ethylene and 25–60 wt % of $C_{2-10}$ α-olefin;

1–30 parts by wt of process oil having 10–800 cSt (40C) of kinematic viscosity; and 1–20 parts by wt of inorganic filler selected from talc, calcium carbonate, calcium sulfate, magnesium oxide, calcium stearate, mica, silica, calcium silicate, clay and carbon black.

16. A car mat comprising a layer of the polypropylene resin of claim 15.

* * * * *